(12) United States Patent
Jensen et al.

(10) Patent No.: US 7,310,934 B1
(45) Date of Patent: Dec. 25, 2007

(54) METHOD OF MAKING ONE-WAY CHAIN

(75) Inventors: Robert D. Jensen, Winona, MN (US); Glenn Agrimson, Peterson, MN (US)

(73) Assignee: Peerless Chain Company, Winona, MN (US)

( * ) Notice: Subject to any disclaimer, the term of this patent is extended or adjusted under 35 U.S.C. 154(b) by 0 days.

(21) Appl. No.: 11/611,227

(22) Filed: Dec. 15, 2006

Related U.S. Application Data (60) Provisional application No. 60/751,186, filed on Dec. 16, 2005.

(51) Int. Cl.
*B21L 15/00* (2006.01)

(52) U.S. Cl. .............................. 59/35.1; 59/21; 59/23; 59/30; 59/78

(58) Field of Classification Search ...................... 59/3, 59/16, 21, 22, 27, 30, 35.1, 78, 83, 84, 90
See application file for complete search history.

(56) References Cited

U.S. PATENT DOCUMENTS

| | | | | |
|---|---|---|---|---|
| 2,069,980 | A * | 2/1937 | Stahl | 59/35.1 |
| 2,732,178 | A * | 1/1956 | Chaney | 59/84 |
| 4,682,467 | A * | 7/1987 | Waltemyer et al. | 59/30 |
| 4,841,898 | A * | 6/1989 | Ballantyne | 114/293 |
| 4,850,768 | A * | 7/1989 | Huber | 59/84 |
| 5,660,036 | A * | 8/1997 | Rozenwasser | 59/80 |
| 7,065,952 | B2 * | 6/2006 | Benecke | 59/78 |

OTHER PUBLICATIONS

Naval Air System Command (NASC); Chain, One Way; NASC Specification Control Drawing 1540A5117; Dec. 16, 2005.
Naval Air System Command (NASC); Hook and Chain Assembly; NASC Specification Control Drawing 1540A8101; Dec. 16, 2005.

* cited by examiner

*Primary Examiner*—David B Jones
(74) *Attorney, Agent, or Firm*—Moore & Hansen PLLP (57) ABSTRACT

One-way chain for an aircraft tie-down, as well as a method of making one-way chain. The method preferably includes the steps of providing an unmodified welded chain having a plurality of welded links; feeding the unmodified chain into an automated shaping machine constructed and arranged to shape the welded links in separate shaping events; and individually shaping the welded links to form shaped links in a series of separate shaping events that shape the respective welded links so that a first width of a forward end of the respective shaped link is narrower than a second width of the greatest planar width of a rearward end of the respective shaped link; such that the forward end is sized to fit into a link receiving receptacle of a screw-type binder mechanism and the rearward end will not fit into the link receiving receptacle.

21 Claims, 6 Drawing Sheets

METHOD OF MAKING ONE-WAY CHAIN

BACKGROUND OF THE INVENTION

One-way chain is an important component of aircraft tie-downs used to secure portions of the undercarriage of an aircraft to the deck of an aircraft carrier or, perhaps, to the surface of an air field or other finished surface where such an airplane might be secured. The tie-downs are particularly important to prevent the loss or damage of an aircraft either to strong gusts of wind or, perhaps, to unusually large waves that occasionally sweep over the deck of an aircraft carrier in high seas, when aircraft are occasionally kept on the upper deck adjacent to the landing surface. In view of the extremely high cost of such aircraft, these tie-downs are an important maintenance accessory.

The tie-down devices that employ one-way chain generally included a screw-type binder mechanism having a seat for a one-way chain link at one end and a series of secured elements culminating in a securing hook at the other end. To secure an aircraft with the tie-down, the hook at one end of the screw-type binder mechanism is secured to the aircraft and a one-way chain that, subsequently, will be secured at the other end of the binder mechanism in the one-way seat for the one-way chain link, is then secured with a hook at the far end of the chain to a recessed anchor point or deck anchor on the deck of the aircraft carrier or airfield tarmac. After the claim is secured to the recessed anchor point, a link of the one-way chain is then chosen for insertion into the binder seat and the screw collar at the opposite end of the screw-type mechanism is then turned, generally clockwise, to increase the tension on the chain and eliminate or at least minimize the slack in the tie-down.

One-way chain has been employed as a part of such tie-downs for many years to insure that any link entering the seat of the screw-type binder mechanism is oriented appropriately so that the end of the tie-down secured to the recessed anchor point will pull directly on center with respect to the hook at the binder mechanism end of the tie-down that is secured to the undercarriage of the aircraft, so as to minimize the likelihood of failure of the tie-down. One-way chain has been made in the past by stamping each of the links of a welded chain at one end of the chain so that the stamped links will be pinched to form "nibs" on two sides of one end of the respective welded links so as to expand the clearance width of each of the respective ends of the oblong welded links of such a one-way chain. It will be appreciated, however, that the nibs (see FIGS. 3 and 4 of the present drawings showing such links), created by known stamping methods, are not as substantial as a thickness of the link itself. For that reason, concerns have been raised regarding the usefulness of known one-way chain having such "stamped" links.

In particular, it has been suggested that because the "nibs" are not as substantial as the formed wire making up each of the respective welded links, there may be a greater chance that the nibs will wear away over time and permit the "wrong" end, i.e. the end intended to have the greater clearance requirement, of a link of the known one-way chain to fit into the one-way seat of the screw-type binder mechanism, leading to failure to the one-way tie-down. For this reason, new methods of making a better one-way chain are needed.

It will be appreciated from the foregoing, therefore, that known methods of making one-way chain present problems that are in need of solutions. It also will be appreciated that further enhancements of the cost effectiveness of the present invention will provide needed efficiencies for consumers and manufacturers alike. The present invention provides simple and reliable solutions to these and other problems.

SUMMARY OF THE INVENTION

The present invention provides a method of making one-way chain for use as a part of an aircraft tie-down having a screw-type binder mechanism including a link receiving receptacle or seat for a one-way link, the method preferably includes the steps of: providing an unmodified welded chain having a plurality of welded links; feeding the unmodified chain into an automated shaping machine constructed and arranged to shape each of the plurality of welded links in separate shaping events and individually shaping each of the plurality of welded links to form shaped links in a series of separate shaping events that shape the respective welded links so that a first width of the greatest planar dimension of a forward end of the respective shaped link is narrower than a second width of the greatest planar dimension of a rearward end of the respective shaped link, such that the forward end is sized to fit into the link receiving receptacle of the screw-type binder mechanism and the rearward end will not fit into the link receiving receptacle.

In preferred embodiments of the present invention, the automated shaping machine includes a plurality of shaping dies constructed and arranged to individually shape a series of the plurality of welded links in the series of shaping events and the step of individually shaping will include shaping a first series of welded links to form a first series of shaped links with a first shaping die in a first series of shaping events and shaping a second series of welded links to form a second series of shaped links with a second shaping die in a second series of shaping events, wherein the first series of welded links and the second series of welded links alternate with one another within the unmodified chain. The step of feeding the unmodified chain preferably includes orienting the unmodified chain such that the first series of welded links is oriented in a horizontal orientation with respect to the automated shaping machine and the second series of welded links is oriented in a vertical orientation with respect to the automated shaping machine.

In preferred embodiments, the first series of shaping events include shaping one of the horizontally oriented welded links with a first shaping die and the second series of shaping events include shaping one of the vertically oriented welded links with the second shaping die.

In further embodiments, the first series of shaping events each preferably include simultaneously striking one of the horizontally oriented welded links with two first shaping dies that are constructed and arranged to simultaneously strike such a horizontally oriented welded link from opposing sides so as to shape the forward end of the respective welded link so that shaped link will be pear-shaped and the forward end of the resulting shaped link will fit into the link receiving receptacle, but the rearward end will not.

In further embodiments, each of the two first shaping dies preferably have striking surfaces that are oriented at respective angles that mirror one another. In yet further embodiments, the second series of shaping events will preferably include striking one of the vertically oriented welded links with a second shaping die that includes a second striking surface that is oriented at an angle to a first plane in which a horizontal segment of the vertically oriented welded link rests.

In preferred embodiments of the present invention, the invention will include a one-way chain including a plurality of pear-shaped links made by a method of the present invention. The method of making one-way chain of the present application may include a step of welding each of the respective links to form the unmodified chain in place of providing unmodified chain that is subsequently fed into the automated shaping machine of the present invention. The links are welded in any manner that is well known in the art.

It is an object of the present invention to provide a one-way chain including a plurality of pear-shaped links, preferably shaped by an automated shaping machine of the present invention constructed and arranged to shape each of a plurality of welded links in separate shaping events to form shaped links in a series of separate shaping events that shape the respective welded links so that a first width of a greatest planar dimension of a forward end of the respective shaped link is narrower than a second width of the greatest planar dimension of a rearward end of the respective shaped link, such that the forward end is sized to fit into a link receiving receptacle of a screw-type binder mechanism of an aircraft tie-down.

The above-described features and advantages along with various other advantages and features of novelty are pointed out with particularity in the claims annexed hereto and forming a part hereof. However, for a better understanding of the invention, its advantages, and objects attained by its use, reference should be made to the drawings, which form a further part hereof and to the accompanying descriptive matter describing preferred embodiments of the present invention.

BRIEF DESCRIPTION OF THE DRAWINGS

In the drawings, in which like reference numerals and letters indicate corresponding parts throughout the several views.

FIG. 9A is a schematic view of a portion of a chain as shown in partial cross section prior to any contact between the vertical die 72 and the vertically oriented link 52a and the horizontal dies 76 and the horizontally oriented link 56a;

DETAILED DESCRIPTION OF THE PREFERRED EMBODIMENTS

Figure 1:
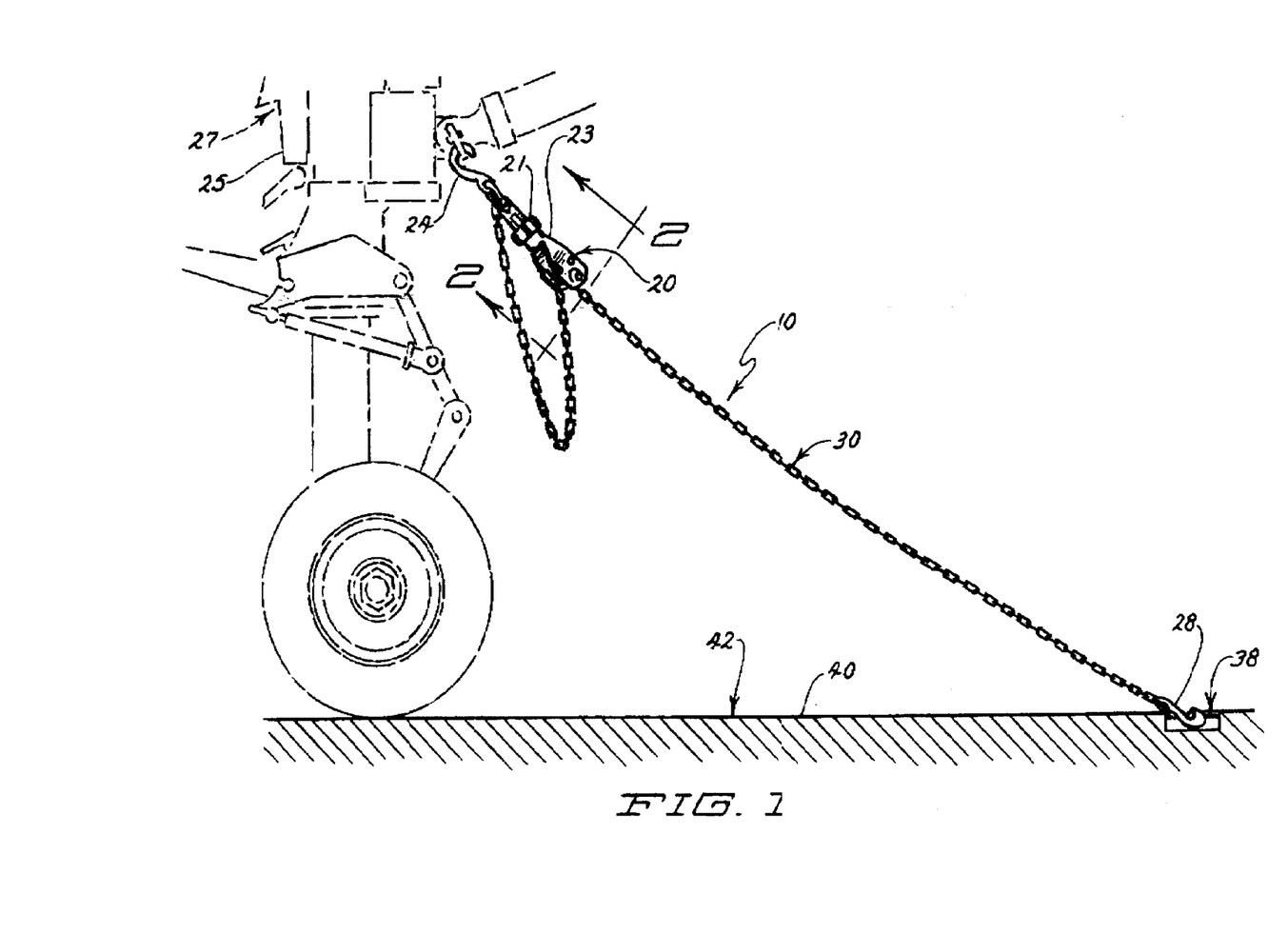
FIG. 1 is a perspective view of an aircraft tie-down 10 having a screw-type binder mechanism 20 to which the one-way chain 30 of the present invention is secured; the aircraft tie-down 10 of the present invention is shown securing a portion of an under carriage 25 of an airplane 27 (shown only partially in phantom) to a recessed anchor point 38 on a deck 40 of an aircraft carrier 42 (shown only partially)

Referring now to FIG. 1, one embodiment of the present invention is an aircraft tie-down 10 of the kind shown. The preferred aircraft tie-down includes a screw-type binder mechanism 20 including a tensioning collar 21 that will shorten the length of the binder mechanism 20 when the collar is turned with respect to the body 23 of the binder mechanism 20, thus reducing any slack in the tie-down 10 when the tie-down is secured to an undercarriage 25 of an airplane 27, as well as to a deck 40 of an aircraft carrier 42 (shown only in part) or other suitable aircraft storage surface.

Figure 2:
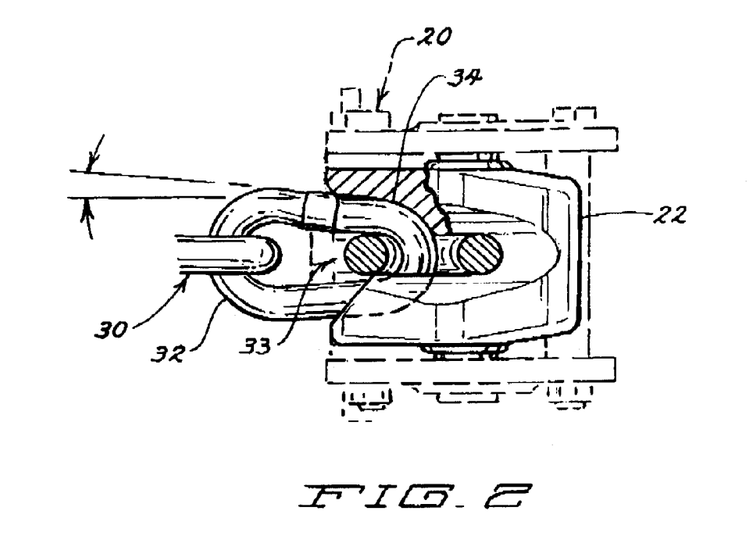
FIG. 2 is a partial sectional view of a link receiving receptacle 22, as shown from the line 2-2 of FIG. 1, pivotally engaged within a portion of the screw-type binder mechanism 20 shown more fully in FIG. 1; the link receiving receptacle 22 is partially broken away to show the manner in which a pear-shaped link 32 of the present invention is received in the receptacle or seat 22 when the tie-down 10 of the present invention is in use.

Referring now also to FIG. 2, the screw-type binder mechanism 20 includes a one-way link receiving receptacle or seat 22 pivotally secured within the body 23 of the binder mechanism 20. The receptacle or seat 22 is constructed and arranged so that a pear-shaped link 32 of the present invention can slide into a link receiving opening 33 if a forward end 34 of the pear-shaped link 32 is made to fit in the link receiving opening 33, however, the rearward ends of these pear-shaped links 32 of the one-way chain 30 of the present invention will not fit into the same link receiving opening 33.

Figure 3:
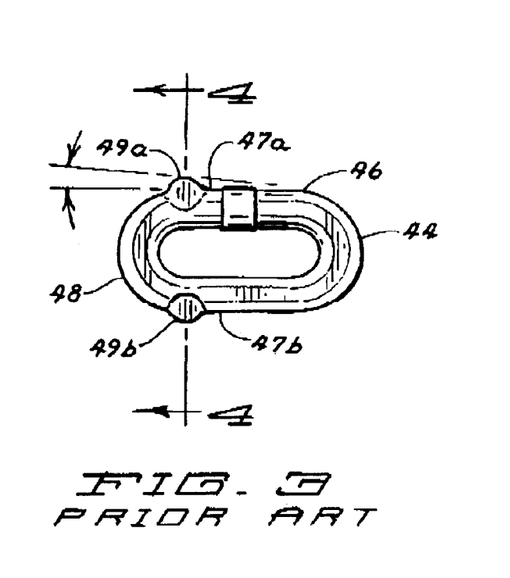
FIG. 3 shows a plan view of a prior art stamped link 46 shown in the drawing in a two dimensional plane in which the greatest planar width of the stamped link 46 is shown.
Figure 4:
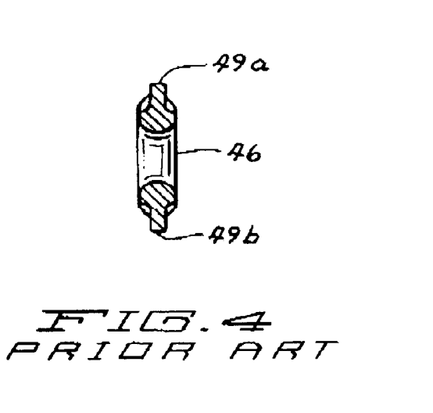
FIG. 4 is a sectional view of the prior art stamped link 46 shown in FIG. 3, as seen from the line 44 of FIG. 3.
Figure 5:
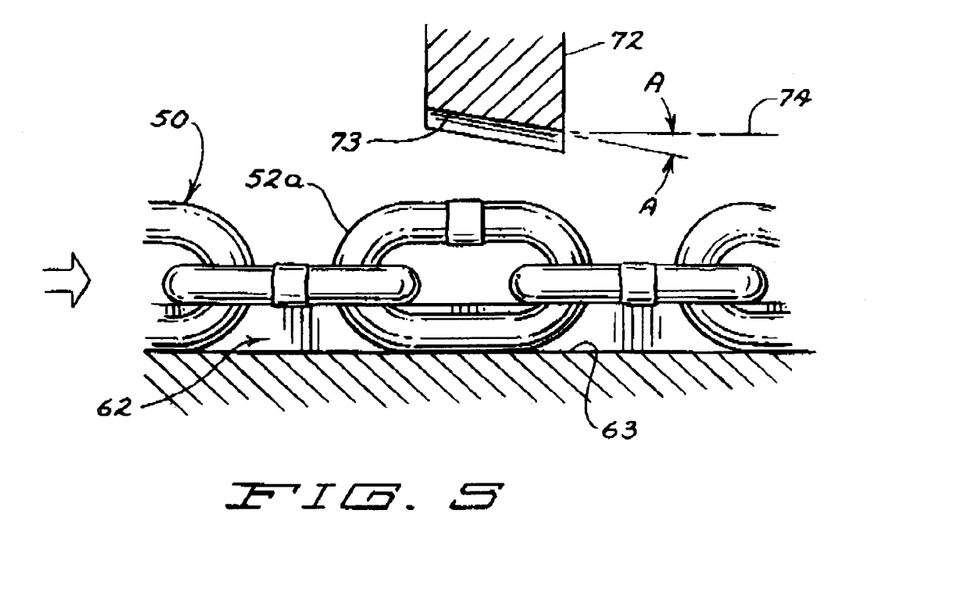
FIG. 5 is a schematic side view of an unmodified welded chain 50 in an automated shaping machine 60 (shown partially); the shaping machine 60 includes a channel 62 through which vertically oriented links 52 pass below a vertical shaping die 72.
Figure 6:
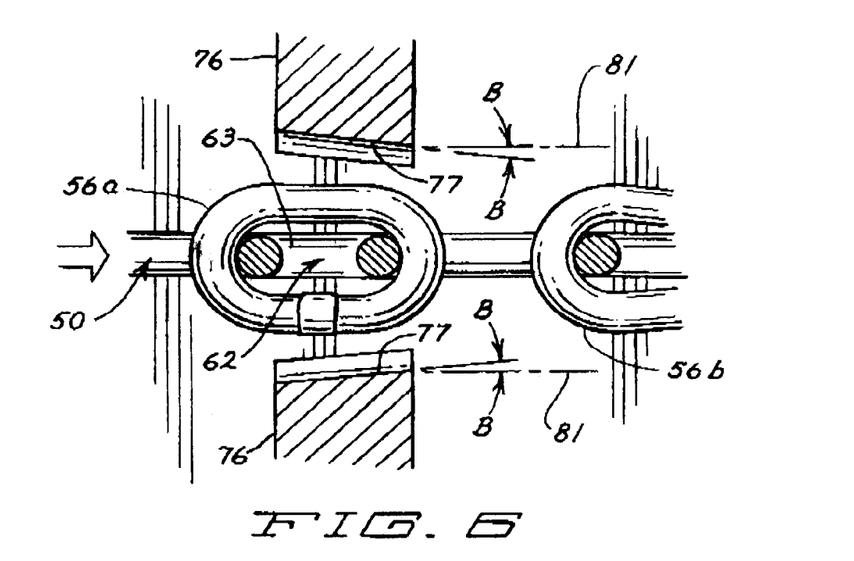
FIG. 6 is a top-plan schematic view of the chain 50 (shown in partial cross section) as it passes through a portion of the automated shaping machine 60 shown in part schematically, (and showing a pair of horizontally driven shaping dies 76.
Figure 7:
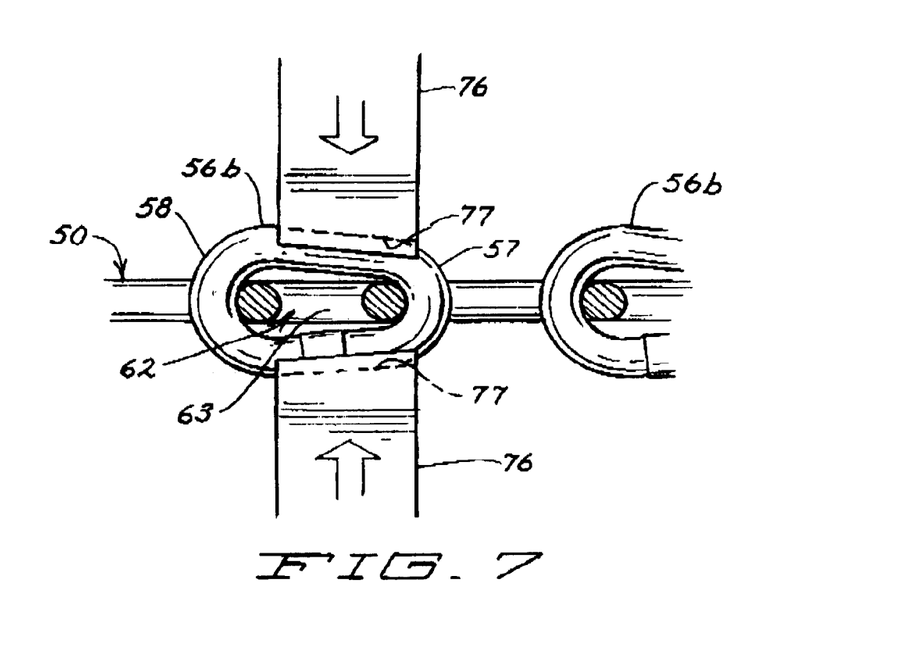
FIG. 7 is a schematic top plane view similar to that shown in FIG. 6, except that the horizontal die 76 has struck the horizontally oriented welded link 56a, shown in Figure, to form a horizontally oriented shaped link 56b having a forward end 57, which has a width that is narrower than the width of a rearward end 58 of the horizontally oriented shaped link 56b.
Figure 8:
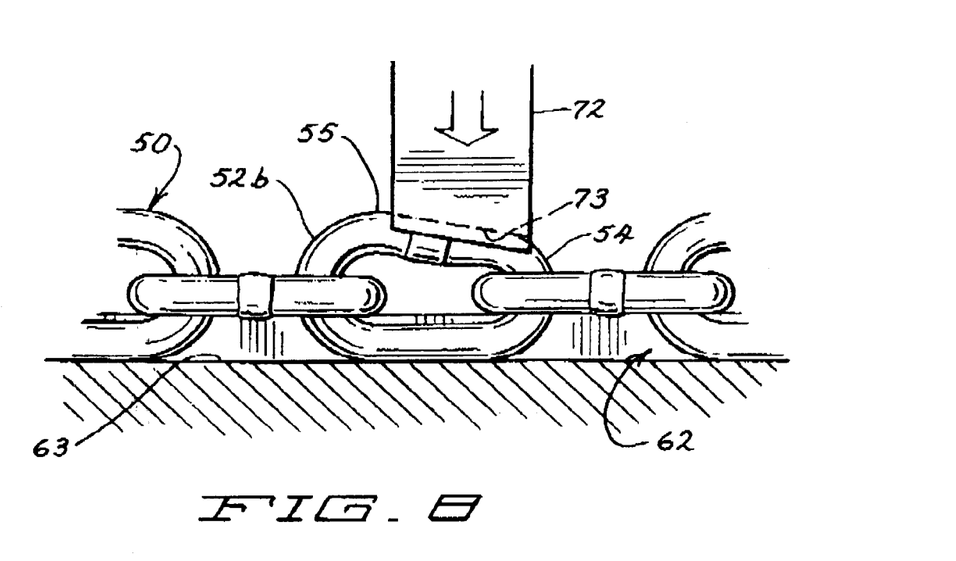
FIG. 8 is a schematic side view similar to that shown in FIG. 5, except that the vertical die 72 has descended down to shape a vertically oriented link 52b similar to the link 52a shown in FIG. 5, except that the action of the vertical die 72 has shaped the vertically oriented shaped link 52b so that the width of a forward end 54 of the shaped link 52b, is narrower than the width of a rearward end 55 of the vertically oriented shaped link 52b, following the action of the vertical shaping die 72.

Referring now also to FIGS. 3 and 4, it will be appreciated that producing an effective one-way chain has previously been attempted. Previously, one-way chain has been made with stamped welded links like the stamped link 46 shown in FIGS. 3 and 4. It is believed that these links are generally created by feeding a chain having a plurality of welded links (not shown) into an automated machine (not shown) that stamps the opposite sides 47a, 47b of a rearward portion 48 of such a welded link to form a stamped link 46 like the one shown in FIGS. 3 and 4. These links 46 have a pair of opposing nibs 49a, 49b that create a widened width on the rearward end 48 of the stamped link 46 as compared to the widths of the forward end 44 of the stamped link 46.

When the tie-down 10 of the present invention is used, a first hook 24 interconnected with the screw-type binder mechanism 20 is secured to the undercarriage 25 of the airplane 27 and a one-way chain 30 of the present invention, preferably including a second hook 28, is secured to a recessed anchor point 38 or deck anchor 38 before a pear-shaped link 32 of the preferred one-way chain 30 is secured in the link receiving channel 33 of the link receiving receptacle 22. The operator using the tie-down 10 will generally endeavor to minimize the slack in the tie-down in selecting the specific pear-shaped link to secure within the link receiving receptacle 22, so that the tensioning collar 21 can be turned to effectively create a sufficient tension on the one-way chain 30 to tightly secure the undercarriage 25 of the airplane 27 to the deck 40 of the aircraft carrier 42 or other surface. It will be appreciated that the forward end 34 of the pear-shaped link 32 of the preferred one-way chain 30 will be sized to fit into the link receiving channel 33 of the link receiving receptacle 32 so that the pear-shaped link 32 will properly seat itself in the channel 33. This will permit the rest of the one-way chain 30 that extends away from the binder mechanism 20 toward the recessed anchor point 38 to draw the binder mechanism 20 on center to the first hook 24 that secures the tie-down 10 to the undercarriage 25 of the airplane 27.

Referring now also to FIGS. 5, 6, 7 and 8, the present invention also provides a process for, or a method of, making one-way chain for use as a part of an aircraft tie-down of the kind shown in FIG. 1, having a screw-type binder mechanism 20 including a link receiving receptacle 22 for a pear-shaped one-way link 32 of the present invention. The method of the present invention preferably includes the steps of providing an unmodified chain 50 that is modified in an automated shaping machine 60 constructed and arranged to shape each of a plurality of welded links in separate shaping events; and individually shaping each of the plurality of welded links to form shaped links in a series of separate shaping events that shape the respective welded links so that a first width of a greatest planar dimension of a forward end of a respective shaped link is narrower than a second width of a greatest planar dimension of a rearward end of the respective shaped link, such that the forward end is sized to fit into the link receiving receptacle 22 of the screw-type binder mechanism 20 and the rearward end will not fit into the link receiving receptacle 22.

As shown schematically in FIGS. 5-8, the unmodified chain 50 is modified as it is indexed through the automated shaping machine 60 (see FIG. 10) as the machine cycles through a series of events. The automated shaping machine 60 has a channel 62 that is generally just a little bit wider than the wire form material used to make each of the respective chain links. As the unmodified chain 50 is drawn through the channel 62, every alternating chain link will be vertically oriented and the links adjacent to the alternating vertically oriented links will be oriented horizontally as the chain 50 is drawn forward within the shaping machine 60.

In preferred embodiments of the automated shaping machine 60, the chain will be drawn or indexed a certain distance, gauged to draw or index the chain forward through the channel 62, two links at a time. The series of indexing movements that draw the chain 50 in a set distance is gauged to draw the chain 50 a distance equal to the length of two chain links so as to bring two unmodified links into position to be shaped, first, by a pair of horizontally oriented shaping dies 76 that modify a horizontally oriented link 56a and, second, by a vertically oriented shaping die 72 that shapes a vertically oriented link 52a residing upright in the channel 62 and resting on a bottom 63 of the channel 62. Following the modification of the horizontally oriented link 56a and the vertically oriented link 52a, the chain 50 is drawn forward or indexed again so that another two unmodified links, one horizontally oriented, and another vertically oriented will reside within the working area of the automated shaping machine 60, so that these two links 52a, 56a will also be shaped in the manner desired. In this regard, it will be appreciated that the order of the shaping steps or shaping events, may be changed so that the vertically oriented link may be modified prior to the horizontally oriented link without departing from the scope of the present invention. Furthermore, although the preferred automated shaping machine 60 utilizes only a single vertical shaping die, it is envisioned that two shaping dies may be used to shape the vertically oriented link in the manner similar to the manner in which the horizontally oriented link is modified. Furthermore, the machine 60 can be changed so that the horizontally oriented link may be modified by a single horizontally oriented shaping die in the manner in which the vertically oriented link is modified, so long as a horizontal channel or other surface is arranged to resist the force of the single horizontally extending shaping die envisioned in this regard.

In the preferred embodiment of the present invention, the shaping surface 73 of the vertically oriented shaping die 72 will extend rearward at an angle A-A to a line 74 parallel to horizontal planes in which the welded links 52a and the bottom 63 of the channel 62 reside of preferably about 11 degrees. The two horizontally oriented dies 76 will each preferably have a shaping surface 77 extending rearwardly with respect to the forward movement of the unmodified chain 50 at an angle B-B of about 5.5 degrees to a line 81 parallel to a horizontal plane established by the forward movement of the chain 50. In each case, the chain links will be shaped so that each elongated segment of each shaped link will extend rearward at an angle of about 5.5 degrees from the plane established by the elongated segments of the unmodified welded links prior to being shaped. It will be appreciated that the actual angle of the truncation of the respective shaped links 32 can be alternated to another angle if the link receiving opening 33 of the link receiving receptacle 22 is changed, and that the angle may vary somewhat to fit the opening.

Figure 9A:
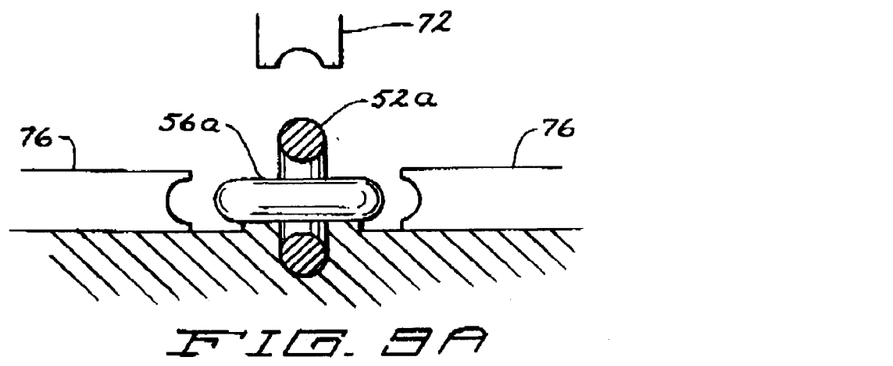
Figure 9B:
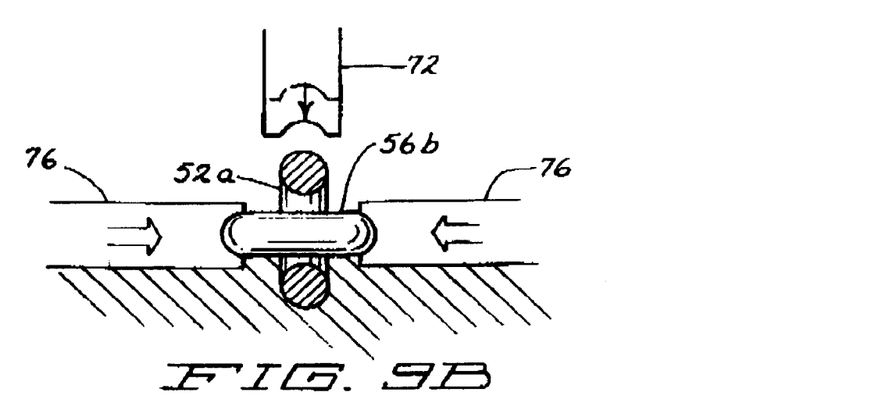
FIG. 9B is a schematic representation similar to that shown in FIG. 9A except that the horizontally oriented link 56a, shown in FIG. 9A, has now been shaped by the horizontal die 76 to form a shaped link 56b.
Figure 9C:
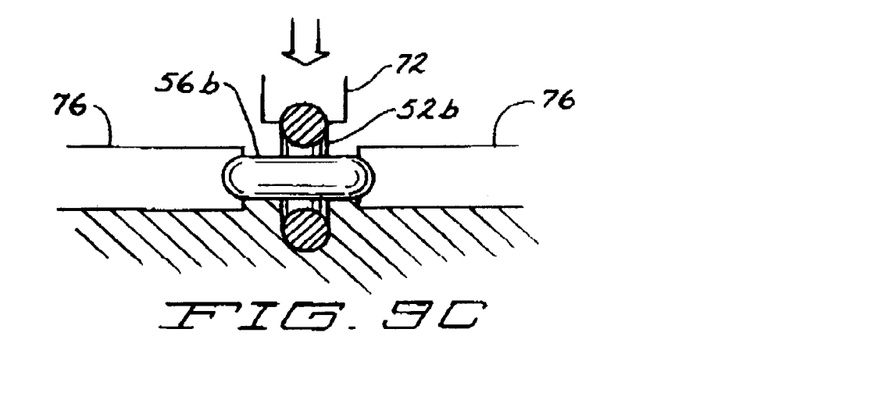
FIG. 9C is a schematic representation similar to that shown in FIG. 9B, except that the vertical die 72 has now descended to strike the vertically oriented link 52a, shown in FIG. 9B, to form a shaped link 52b.

Referring now also to FIGS. 9A, 9B and 9C, the sequence of the various shaping steps is shown. In FIG. 9A, the unmodified chain 50 is shown in position prior to shaping of the two welded links 52 and 56. The vertically oriented link 52 is shown in partial cross section in place within a channel (not seen) that is obscured by the link 52. The horizontally oriented link 56a will be shaped by the horizontally oriented dies 76 in a manner shown in FIG. 9B. As the horizontally oriented dies 76 shape the horizontally oriented link 56a, the vertically oriented die 72 descends just slightly toward the vertically oriented link 52, which its shapes when it descends to engage the vertically oriented link 52a in the manner shown in FIG. 9C.

Figure 10:
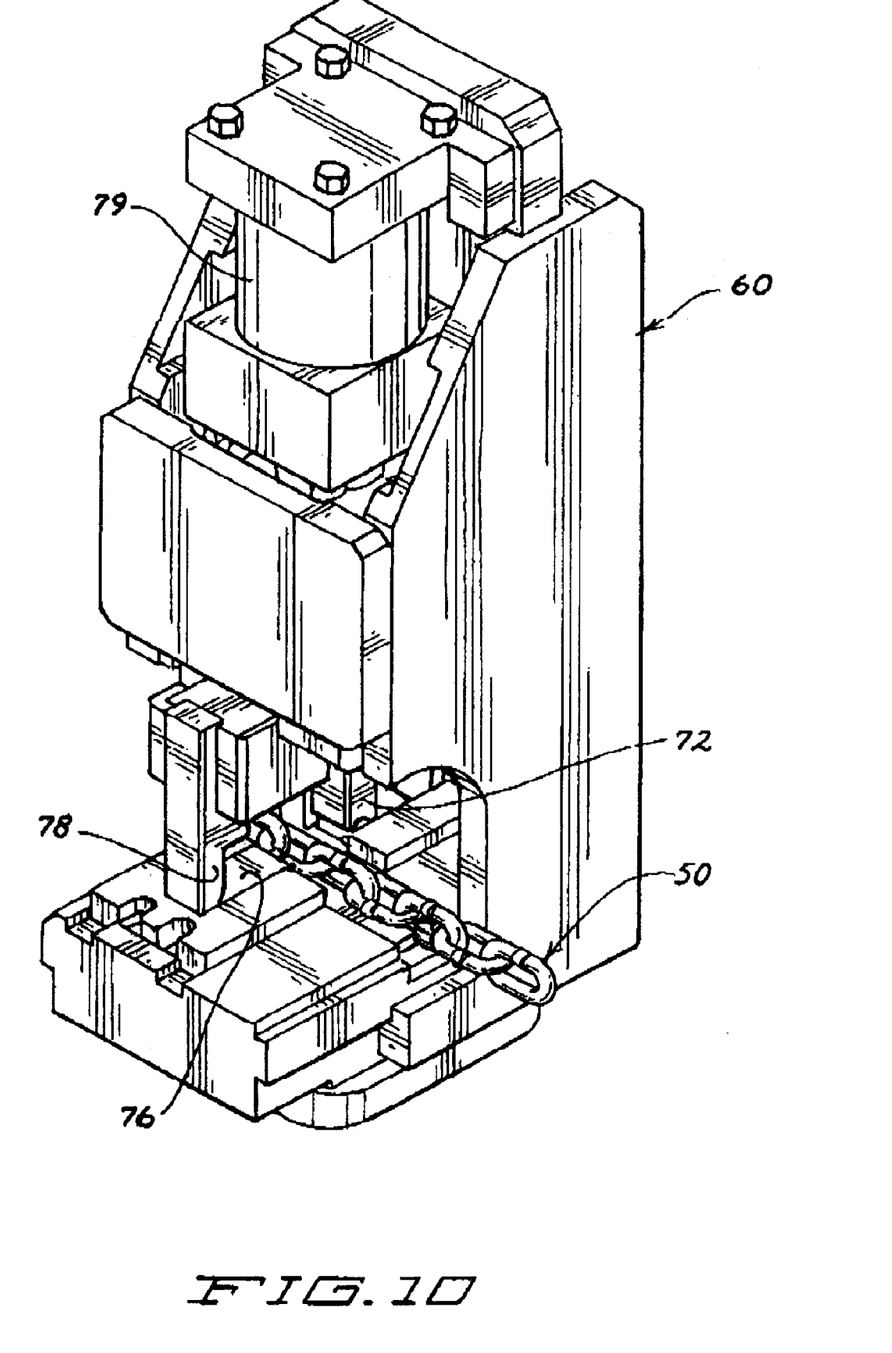
FIG. 10 is a perspective view of an automated shaping machine 60 used to shape the welded links 52 of the unmodified chain 50 that is modified to produce the one-way chain of the present invention.

The following example is provided to further illustrate these steps in the process of making the present one-way chain in the automated shaping machine 60 shown in FIG. 10.

EXAMPLE 1

The automated shaping machine 60, shown in FIG. 10, is constructed and arranged so that the machine employs cam action to move the shaping dies so that the shaping dies shape the individual links of an unmodified chain 50 in groups of two, first, a link 56a that is horizontally oriented and, second, a link 52a that is vertically oriented, but positioned in front of the horizontally oriented link 56a. Once the two links are shaped, the unmodified chain 50 is indexed forward so that the next two adjacent links, one that is horizontally oriented and one that is vertically oriented are indexed forward so that the shaping cycle can be repeated. The cam action results from the movement of two vertical, wedge-shaped, steel bars 78 driven by a hydraulic cylinder 79 and moving in contact with the two horizontal shaping dies 76. The vertically oriented shaping die 72 is interconnected with the hydraulic cylinder 79 such that the vertically shaping die 72 descends simultaneously with the shaft (not shown) of the hydraulic cylinder 79. In this embodiment, the preferred horizontal shaping dies 76 are the same as those described herein above and have shaping surfaces 77 that angle rearward with respect to the movement of the chain in the channel 62 at an angled of about 5.5 degrees to a vertical plane parallel to the movement of the chain 50 within the channel 62. The vertical shaping die 72 has a shaping surface 73 that angles rearward with respect to the movement of the chain in the channel 62 at 11 degrees to a horizontal plane parallel to a bottom 63 of the channel 62, which supports the vertically oriented link 52a when it is shaped by the vertical shaping die 72.

The preferred process for making the one-way chain 30 of the present invention includes the following events that are repeated until each of the welded links of the unmodified chain 50 are shaped to form the preferred pear-shaped links of the preferred one-way chain 30 of the present invention. Each of the following events is accompanied by the specific cam action associated with the event and the status of the hydraulic cylinder during the event is also reported.

Event 1: Index chain two links at a time.

Cam action: None; the chain is drawn forward by the machine's rotating main shaft (not shown) that drives a lever (not shown) causing it to engage a welded chain link by dropping a tip (not shown) into an open area in the center of the link. The rotation of the shaft pulls the lever and the engaged link forward against a mechanical stop (not shown) to position the links for the shaping operation.

Hydraulic cylinder status: Waiting in up position.

Event 2: End chain indexing in the forward direction.

Cam action: The position of the chain, as it is moving forward, is sensed by dual photovoltaic sensors or eyes (not shown). Once the chain is confirmed to be in the proper position, the photovoltaic sensors send an electronic signal to a hydraulic cylinder (not shown) to begin a downward motion. This signal also starts a timer (not shown) in the control system that will determine the duration of the extending motion of the cylinder.

Hydraulic cylinder status: Beginning downward (extending) motion.

Event 3: Two side or horizontally oriented dies 76 simultaneously move inward to shape the horizontally orient link 56a.

Cam action: An angled face (not shown) of cylinder-driven wedges (not shown) make contact with the two horizontal shaping dies 76 and drive them both inward.

Hydraulic cylinder status: Cylinder continues in downward (extending) motion.

Event 4: Vertical die 72 contacts the top surface of the vertically oriented link 52a to shape the link.

Cam action: After a slight delay determined by the shape of the wedge surface (not shown), the vertical die 72 attached to the cylinder contacts the vertical link 52a. The horizontal dies 76 are retracted outward to their start position.

Hydraulic cylinder status: Cylinder continues in downward (extending) motion.

Event 5: End of shaping operation.

Cam action: The cylinder-driven wedges (not shown) strike a mechanical stop or stroke limiter (not shown). The timer (not shown) signals the end of the downward (extension) stroke of the cylinder.

Hydraulic cylinder status: After full extension to the mechanical stop (not shown), the cylinder retracts to the up position.

Event 6: Index chain again, two links at a time, as before, restarting the cycle.

Cam action: Starts the cycle all over again due to the continuous rotation of the machine's main shaft (not shown) driving the lever (not shown) that drops into a welded link and pulls it forward.

The automated shaping machine 60 will produce one-way chain of the present invention at a rate of 50 shaped links per minute.

It is to be understood that even though numerous characteristics and advantages of the various embodiments of the present invention have been set forth in the foregoing description, together with details of the manufacture of the present one-way chain and its use and the various steps of the method of making one-way chain, this disclosure is illustrative only and changes may be made in detail, especially in matters of additional components and/or steps in the method of practicing the various embodiments of the present invention, all within the principles of the present invention, to the full extent indicated by the broad general meaning of the terms in which the appended claims are expressed.

What is claimed is:

1. A method of making one-way chain for use as a part of an aircraft tie-down having a screw-type binder mechanism including a link receiving receptacle for a one-way link, the method comprising the steps of:

providing an unmodified chain having a plurality of welded links;

feeding the unmodified chain into an automated shaping machine constructed and arranged to shape welded links in separate shaping events; and shaping welded links to form shaped links in a series of separate shaping events that shape the respective welded links so that a first width of a greatest planar dimension of a forward end of the respective shaped link is narrower than a second width of the greatest planar dimension of a rearward end of the respective shaped link, such that the forward end is sized to fit into the link receiving receptacle of the screw-type binder mechanism and the rearward end will not fit into the link receiving receptacle.

2. The method of chain 1, wherein the automated shaping machine includes a plurality of shaping dies constructed and arranged to individually shape a series of the welded links individually in the series of separate shaping events and the step of individually shaping includes shaping a first series of welded links to form a first series of shaped links with a first shaping die in a first series of shaping events and shaping a second series of welded links to form a second series of shaped links with a second shaping die in a second series of shaping events, wherein the first series of welded links and the second series of welded links alternate with one another within the unmodified chain.

3. The method of claim 2, wherein the step of feeding the unmodified chain includes the step of orienting the unmodified chain such that the first series of welded links is oriented in a horizontal orientation with respect to the automated shaping machine and the second series of welded links is oriented in a vertical orientation with respect to the automated shaping machine.

4. The method of claim 3, wherein the first series of shaping events include shaping one of the horizontally oriented welded links with a pair of opposing first shaping dies and the second series of shaping events include shaping one of the vertically oriented welded links with the second shaping die.

5. The method of claim 4, wherein the first series of shaping events each include simultaneously striking one of the horizontally oriented welded links with two first shaping dies that are constructed and arranged to simultaneously strike such a horizontally oriented welded link from opposing sides so as to shape the forward end of the respective welded link so that the forward end of the resulting shaped link will fit into the link receiving receptacle, but the rearward end will not.

6. The method of claim 5, wherein each of the two first shaping dies have striking surfaces that are oriented at respective angles that mirror one another.

7. The method of claim 4, wherein the second series of shaping events include striking one of the vertically oriented welded links with a second shaping die that includes a second striking surface that is oriented at an angle to a first plane in which a horizontal segment of the vertically oriented welded link rests.

8. The method of claim 1, wherein the step of shaping includes shaping all of the plurality of welded links in separate shaping events.

9. A method of making one-way chain for use as a part of an aircraft tie-down having a screw-type binder mechanism including a link receiving receptacle for a one-way link, the method comprising the steps of:
providing an unmodified chain having a plurality of welded links;
providing an automated shaping machine constructed and arranged to shape welded links in separate shaping events; the automated shaping machine including a plurality of shaping dies constructed and arranged to individually shape a series of the welded links individually in the series of separate shaping events and the step of individually shaping includes shaping a first series of welded links to form a first series of shaped links with a first shaping die in a first series of shaping events and shaping a second series of welded links to form a second series of shaped links with a second shaping die in a second series of shaping events, wherein the first series of welded links and the second series of welded links alternate with one another within the unmodified chain;
feeding the unmodified chain into the automated shaping machine; and
shaping welded links to form shaped links in a series of separate shaping events that shape the respective welded links so that a first width of a greatest planar dimension of a forward end of the respective shaped link is narrower than a second width of the greatest planar dimension of a rearward end of the respective shaped link, such that the forward end is sized to fit into the link receiving receptacle of the screw-type binder mechanism and the rearward end will not fit into the link receiving receptacle.

10. The method of claim 9, wherein the step of feeding the unmodified chain includes the step of orienting the unmodified chain such that the first series of welded links is oriented in a horizontal orientation with respect to the automated shaping machine and the second series of welded links is oriented in a vertical orientation with respect to the automated shaping machine.

11. The method of claim 10, wherein the first series of shaping events include shaping one of the horizontally oriented welded links with a pair of opposing first shaping dies and the second series of shaping events include shaping one of the vertically oriented welded links with the second shaping die.

12. The method of claim 11, wherein the first series of shaping events each include simultaneously striking one of the horizontally oriented welded links with two first shaping dies that are constructed and arranged to simultaneously strike such a horizontally oriented welded link from opposing sides so as to shape the forward end of the respective welded link so that the forward end of the resulting shaped link will fit into the link receiving receptacle, but the rearward end will not.

13. The method of claim 12, wherein each of the two first shaping dies have striking surfaces that are oriented at respective angles that mirror one another.

14. The method of claim 11, wherein the second series of shaping events include striking one of the vertically oriented welded links with a second shaping die that includes a second striking surface that is oriented at an angle to a first plane in which a horizontal segment of the vertically oriented welded link rests.

15. The method of claim 9, wherein the step of shaping includes shaping all of the plurality of welded links in separate shaping events.

16. A method of making one-way chain for use as a part of an aircraft tie-down having a screw-type binder mechanism including a link receiving receptacle for a one-way link, the method comprising the steps of:
providing an unmodified chain having a plurality of welded links;
feeding the unmodified chain into an automated shaping machine constructed and arranged to shape every other link of the plurality of welded links in separate shaping events;
shaping every other link of the unmodified chain in an automated shaping machine to form a partially modified chain of shaped links and unshaped links in a first series of separate shaping events that shape every other of the respective welded links so that a first width of a greatest planar dimension of a forward end of the respective shaped link is narrower than a second width of the greatest planar dimension of a rearward end of the respective shaped link, such that the forward end is sized to fit into the link receiving receptacle of the screw-type binder mechanism and the rearward end will not fit into the link receiving receptacle; and
shaping the partially modified chain in the automated shaping machine to form a completed one-way chain such that only the unshaped links are shaped in a second series of separate shaping events that shape the respective welded links so that a first width of a greatest planar dimension of a forward end of the respective shaped link is narrower than a second width of the greatest planar dimension of a rearward end of the respective shaped link, such that the forward end is sized to fit into the link receiving receptacle of the screw-type binder mechanism and the rearward end will not fit into the link receiving receptacle.

17. The method of making a one-way chain of claim 16, wherein separate automated machines form the respective partially completed one way chain and the completed one-way chain.

18. The method of claim 16, wherein the steps of shaping include shaping one of the welded links with a pair of opposing shaping dies.

19. The method of claim 18, wherein the steps of shaping include simultaneously striking one of the welded links with two shaping dies that are constructed and arranged to simultaneously strike such a welded link from opposing sides so as to shape the forward end of the respective welded link so that the forward end of the resulting shaped link will fit into the link receiving receptacle, but the rearward end will not.

20. The method of claim 19, wherein each of the two shaping dies have striking surfaces that are oriented at respective angles that mirror one another.

21. The method of claim 16, wherein the step of shaping includes striking one of the welded links with a shaping die that includes a striking surface that is oriented at an angle to a first plane in which a horizontal segment of the welded link rests.

* * * * *